July 14, 1959  F. E. PAYNE  2,894,770
ROTARY MECHANICAL SEAL
Filed Nov. 22, 1955

*INVENTOR:*
FRANK E. PAYNE
BY
Edward R. Lowndes

United States Patent Office 2,894,770
Patented July 14, 1959

2,894,770

ROTARY MECHANICAL SEAL

Frank E. Payne, Glencoe, Ill., assignor to Crane Packing Company, Chicago, Ill., a corporation of Illinois Application November 22, 1955, Serial No. 548,337

5 Claims. (Cl. 286—11.14)

The present invention relates to rotary mechanical seals for effecting a seal between relatively rotatable machine elements. More specifically, the invention relates to an improved form of end face seal wherein the sealing effect is attained by the face-to-face running contact between two relatively hard materials as for example between metal-to-metal parts or between metal-to-carbon parts.

The improved seal comprising the present invention has been designed primarily for use in connection with hydraulic torque converter mechanism for installation as a package-type seal within a recess provided in the gear pump casing of the transmission in such a manner that the seal assembly will effectively prevent leakage of fluid along the pump hub which extends through an opening provided in the pump casing. Accordingly, the seal has been illustrated herein as being associated with such a torque converter mechanism, but it will, of course, be understood that other uses are contemplated for the present seal assembly in special applications and the nature of the present seal is such that it will be found particularly useful where relatively high temperatures in the neighborhood of 275° F. are encountered, in steam installations where high temperatures and high pressures are not uncommon, as well as in chemical manufacturing or treating installations where corrosive liquids are pumped under pressure at high temperatures. Irrespective however of the particular use to which the present invention may be put, the essential features of the same are at all times preserved.

It is among the principal objects of the present invention to provide a unitary compact package-type seal including a sealing washer having a flat radially extending sealing surface designed for running sealing engagement with a similar sealing surface provided on a sealing seat, the washer being disposed within a cup-shaped retainer capable of being pressed into position within a recess provided in one of the relatively rotatable elements undergoing sealing, together with a novel form of sealing means whereby the washer is effectively sealed to a wall of the retainer, the sealing means including a rubber element which is maintained in a protected position so that it cannot be squeezed past the elements which it is intended to seal and also so that it is maintained out of contact with the liquid which it is intended to seal.

Another object of the invention is to provide a seal of this character in which the seal parts are so designed that the overall seal assembly may be made relatively short, thereby enabling the same to be installed within a comparatively small space. In carrying out this last mentioned object the invention contemplates the use of a resilient sealing assembly which is interposed between the washer and one wall of the seal retainer and which assembly is in the form of a rubber or other elastomeric O ring, the latter being partially encased within a surrounding sealing shield or sheathe which is generally U-shaped in cross section to provide an annular channel therearound into which the O ring fits with the ring substantially filling the channel. An annular surface on the washer bears against the O ring at the open side of the channel and means are provided for normally urging the sealing means forwardly in the retainer so that the O ring will become compressed in one direction thereby expanding the O ring into contact with the walls of the channel whereby these walls are spread apart and caused to move into sealing engagement with an outer cylindrical surface on the washer and an inner cylindrical surface on the retainer respectively to create a permanent sealing effect at these regions.

Still another object of the invention is to provide a seal of the character briefly outlined above in which an extremely efficient sealing action between the walls of the sealing sheathe and the surfaces on the washer and retainer respectively may be obtained by the application of a relatively small amount of pressure to the encased O ring thus enabling the use of a relatively light leaf-type spring which occupies but little space within the seal assembly.

A still further object of the invention is to provide a seal assembly having resilient sealing means associated therewith as outlined above for effectively sealing an outer cylindrical surface on the washer to an inner cylindrical surface on the retainer utilizing an inner O ring and an outer channel-shaped sheathe therefor in which longitudinally directed compressional forces applied to the O ring will result in radial expansion of the O ring so as to spread the channel walls radially outwardly in opposite directions against the surfaces which they are intended to seal and in which, furthermore, the effectiveness of the sealing action is in direct proportion to the applied pressure on the O ring.

Finally, it is an object of the invention to provide a seal of this character in which the sealing means per se consists of the aforementioned O ring and sheathe wherein the sheathe is formed of a material such as a polytetrafluoroethylene polymer which has a substantial degree of resistance to compressional forces as well as a tendency for cold flow and in which any permanent or temporary deformation of the sheathe, due to such cold flow which ordinarily would tend to lessen the effectiveness of the sealing action, will be counteracted by the permanent resiliency of the inner O ring so that after continued use of the seal any deformation of the sealing sheathe will be compensated for by the increased spreading action of the elastomeric O ring.

Numerous other objects and advantages of the invention not at this time enumerated will become more readily apparent as the nature of the invention is better understood.

In the accompanying single sheet of drawings forming a part of this specification a preferred embodiment of the invention has been shown.

Figure 1:
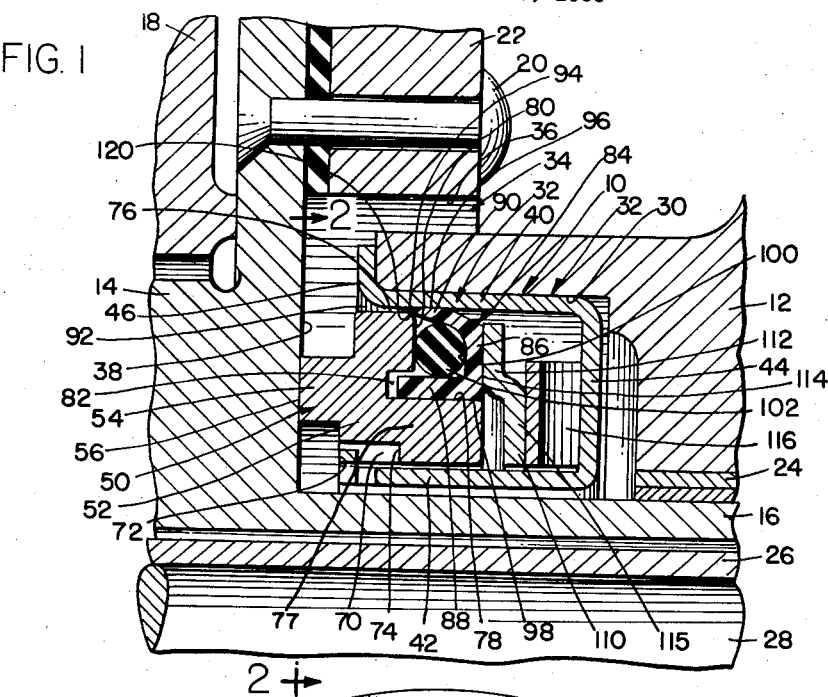
Fig. 1 is a longitudinal sectional view taken substantially centrally through the improved seal showing the same operatively installed within a torque converter assembly.
Figure 2:
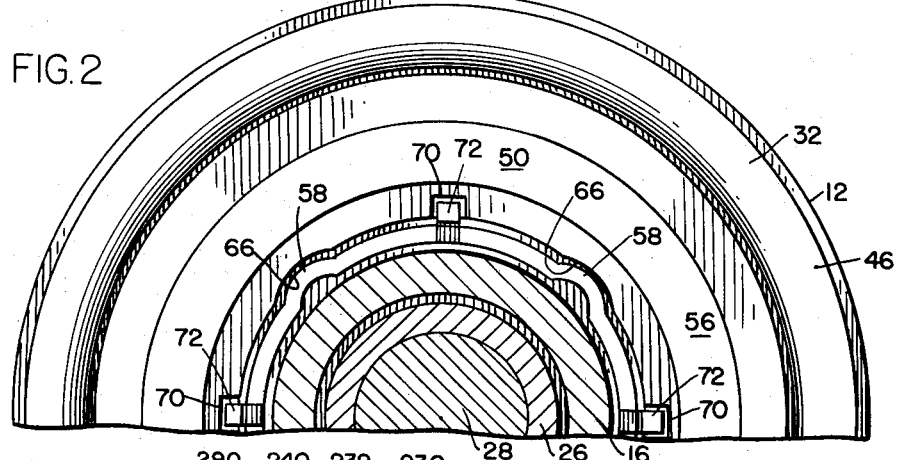
Fig. 2 is a sectional view taken substantially along the line 2—2 of Fig. 1.

Referring now to the drawings in detail and in particular to Figs. 1 and 2 wherein one form of a seal assembly constructed according to the present invention is shown, the seal is designated in its entirety at 10 and is shown operatively installed in a hydraulic torque converter mechanism, this illustration being purely exemplary inasmuch as the seal assembly is capable of installation in other mechanism having relatively rotatable parts.

Only such portions of the torque converter assembly which are pertinent to the use of the present seal 10 have been illustrated and among these parts are the outer housing 12 of the front oil pump of the torque converter mechanism, this pump being of the meshing gear type; the pump hub 14 including a sleeve-like extension 16; and the torque converter housing 22 to which the hub 14 is secured as for example by means of rivets 20. The sleeve 16 is rotatably journaled by a suitable sleeve bearing 24 in the gear pump housing 12. A central sleeve 26 operatively connected to the torque converter impeller and the transmission drive shaft 28 respectively are incidental disclosures which have no particular relation to the present seal assembly.

The gear pump housing 12 is rotatable relative to the sleeve 16 and it is necessary to effect a fluid seal between these two parts. Accordingly, the housing 12 is provided with an annular recess 30 therein into which there is pressed a retainer 32 which forms a part of the present seal assembly. The pump hub 14 is secured to the torque converter housing 22 in such a manner that these two parts cooperate to produce an annular recess 34 having a cylindrical wall 36 and a radial wall 38. The forward end of the pump housing 12 projects a slight distance into the recess 34 and the seal on the assembly 10 is contained partially within the recess 30 and partially within the recess 34 between the end of the pump housing and the radial wall 38 of the recess 34. The seal retainer 32 is of shell-like configuration and includes an outer cylindrical portion 40 and an inner cylindrical portion 42, commonly known as a centerpost, this centerpost extending forwardly from an end wall or abutment 44 which connects the two cylindrical walls 40 and 42. The retainer is provided with an open rim 46 which is turned radially outwardly and which may serve to limit the depth to which the retainer 32 is pressed into the recess 30 in which it is mounted.

Slidably disposed on the centerpost 42 and within the retainer 32 is a sealing washer 50 including a body portion 52 having a forwardly extending nose piece 54 formed thereon, the latter being provided with a forward face 56 which is lapped to a high degree of flatness and which is designed for running engagement with the radial wall 38 which is carefully machined to provide a substantially flat sealing surface.

The washer 50 is telescopically received over the centerpost 42 of the retainer 32 and the centerpost is formed with a plurality of longitudinally extending outwardly struck ribs 58 (see also Fig. 2) which extend into a pair of longitudinal grooves 66 provided in the central opening through the washer 50 and the interlocking ribs and grooves just mentioned constitute a driving means whereby the washer may be driven from the housing 12 through the retainer 32. The washer 50 is also formed with a series of forwardly disposed internal grooves 70 therein while the forward end of the centerpost 42 is provided with a corresponding number of inwardly struck tongues 72 which extend into the grooves 70 and bear against forwardly facing ends 74 of the recesses 70 to retain the washer and other seal elements in their assembled relationship against dislodgement so as to provide a "package-type" seal unit.

The washer 50 has an outer cylindrical surface 76 and the rear end of the washer is provided with a rearwardly and outwardly facing recess providing a reduced rearward extension 77 having a cylindrical surface 78 of reduced diameter, the relief in the washer also providing a rearwardly facing wall 80 on the body of the washer. An annular groove 82 is machined or otherwise formed in the washer at the inner region of the wall 80 and serves a function in the seal assembly which will be described presently. The inner side of the groove 82 forms a cylindrical extension of the cylindrical surface 78.

In order to seal the washer 50 to the retainer 32 and prevent passage of fluid around the washer a continuous unbroken packing ring or sheathe 84 is disposed between the reduced cylindrical surface 78 of the washer and the inner cylindrical surface of the outer cylindrical portion 40 of the retainer 32. This ring is generally of U-shaped cross section and is preferably formed of a material which is relatively incompressible, as for example, the polytetrafluoroethylene polymer known as "Teflon," this material being the trademark name of E. I. du Pont de Nemours & Co. for a substance described in Industrial and Engineering Chemistry, vol. 38, page 870, September 1946. The channel-shaped ring 84 has a body portion 86, an inner cylindrical wall 88 and an outer wall 90, the forward side of the ring being open. The wall 88 of the ring 84 extends a slight distance into the annular groove 82 while the wall 90, which may be frusto-conical, i.e., slightly inclined from the axial direction of the seal assembly, projects into the space 92 existing between the cylindrical surface 76 of the washer and the inner cylindrical surface of the retainer 32 and may terminate in a tapered lip 94. The wall 90 of the ring 84 has an outer cylindrical surface 96 which bears against the inner surface of the retainer portion 40 in sealing relationship. The packing ring wall 88 has an inner cylindrical surface 98 which bears against the cylindrical surface 78 of the washer when the ring is in its assembled position within the seal unit. The body portion 86 of the ring 84 has a forwardly facing surface 10 which constitutes the bottom wall of the channel-shaped packing ring 84 and the latter has operatively installed and disposed therein a continuous O-ring 102 which may be formed of an elastomeric material such as rubber and the radius of cross sectional curvature of which is such that one side of the O-ring nests within the packing ring 84. The forward side of the O-ring 102 bears against the radial wall 80 provided on the washer 50 as clearly shown in Fig. 1 and is adapted to be flattened somewhat by its contact with this surface when the O-ring is placed under compression as will be described presently.

A thrust washer 110 has its outer peripheral region 112 bearing against the rear face 114 of the ring 84 and the inner region 115 of the thrust washer is axially offset from the region 112 and receives the forward thrust of a circular leaf-like spring 116 which is disposed between the washer 110 and end wall 44 of the retainer 32. The spring 116 serves to normally urge the thrust washer 110 forwardly within the retainer 32 so as to press the ring 84 forwardly and thus apply compressional force to the O ring 102 axially thereof in such a manner as to tend to force the cross sectional shape of the O ring into the shape of an ellipse thereby spreading the two packing ring walls 88 and 90 apart and causing the same to sealingly bear against the wall 78 of the washer and the inner surface of the retainer portion 40 respectively. The rear edge of the cylindrical surface 76 of the washer, where it merges with the radial surface of the washer, is generally rounded as at 120 and this rounded edge is adapted to bear against the inner inclined surface of the wall 90 in the vicinity of the tapered lip 94 so as to assist the action of the O ring 102 in normally urging the surface 96 of the lip into sealing engagement with the retainer portion 40.

From the above description it will be seen that when the seal is operatively installed in a suitable environment, as for example the torque converter installation herein illustrated, the Teflon ring 84 is capable of limited sliding movement on the rearward extension of the washer which provides the cylindrical surface 78. The degree to which the ring 84 is moved forwardly on the washer 50 is a function of the pressure of the spring 116 and any internal pressure which may be built up within the fluid side of the torque converter assembly. The deformation of the O ring 102 is proportional to the pressure exerted thereon by the ring 84 and it will be observed that the greater the pressure brought to bear on this O ring the greater will be its distortion and consequently its spreading action so that as higher pressures are involved the greater will be the sealing effect between the lip 94 and the inner cylindrical wall surface of the retainer portion 40. The O ring 102 is effectively confined between the side wall 90 and the cylindrical surface 78 of the hub-like extension 77, this latter surface comprising a reaction surface for receiving the inward radial thrust of the O ring when the latter is distorted so that the radial spread of the O ring will force the wall 90 and consequently the lip 94 outwardly against the cylindrical wall of the portion 40 of the retainer. Although the inner cylindrical wall 88 is interposed between the O ring and surface 78, the latter surface effectively confines the O ring so that the major portion of its spreading action is radially outwardly rather than radially inwardly.

The entire assembly of the seal instrumentalities within the retainer shell including the washer 50, O ring 102, packing ring 84, thrust washer 110 and certain portions of the spring 116 are bodily slidable within the retainer shell so that as the forward face 56 on the nose piece 54 wears during the normal use of the seal, these elements may slide forwardly on the centerpost 42 to compensate for such wear. The ring 84 however is independently slidable on the washer as previously set forth and, to permit the necessary degree of travel of the packing ring axially on the washer, the annular groove 82 is machined to have a depth sufficient to provide adequate clearance between the forward end of the wall 88 and the bottom of the groove.

Figure 3:
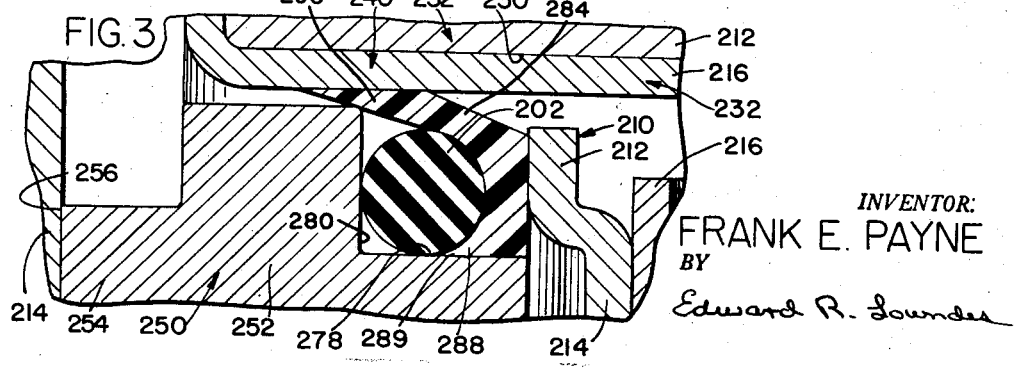
Fig. 3 is a fragmentary sectional view similar to Fig. 1 showing a modified form of the seal.

Referring now to Fig. 3 wherein a somewhat modified form of seal assembly is illustrated, the modified assembly may be employed in the same environment as the seal assembly shown in Figs. 1 and 2. The details of the seal retainer, O ring, thrust washer and spring remain substantially unchanged and to a certain extent the washer and packing ring element are similar but have been slightly modified. Accordingly, to avoid needless repetition of description, similar reference characters bearing a higher numerical order have been applied to the corresponding parts in Figs. 1 and 3. The washer 250 in this form of the invention is provided with a rearwardly facing radial wall 280 and with a cylindrical surface 278 which defines the rearward extension of the washer but the annular groove 82 employed in connection with the washer 50 of Fig. 1 has been omitted. The packing ring 284 has its wall 290 shaped substantially to conform to the shape of the wall 90 but the inner wall 88 has been omitted and the body portion 286 of the ring is carried forwardly as at 288 so that the generally L-shaped packing ring 284 thus provided will partially encompass the O ring 202 and provide a tapered lip 289 which upon radial expansion of the O ring cross section will be forced against the cylindrical surface 278 of the washer in sealing relationship. Otherwise the essential features of the invention have been substantially preserved. The form of the invention shown in Fig. 3 is readily adaptable to the formation of the packing ring 284 by a molding operation rather than by a machining operation which is the case in connection with the ring 84.

The invention is not to be limited to the exact arrangement of parts shown in the accompanying drawings or described in this specification since various changes in the details of construction of the seal may be resorted to without departing from the spirit of the invention. Only insofar as the invention has been particularly pointed out in the accompanying claims is the same to be limited.

What I claim is:

1. In a seal for relatively rotatable elements including a retainer fixed to one element and having a cylindrical inner surface and a radially disposed abutment, a washer having a radially disposed surface adjacent the inner cylindrical surface of the retainer and a cylindrical surface in close proximity to and concentric with the cylindrical surface on the retainer; the combination of a packing element having a tapered lip extending into the space between the concentric cylindrical surfaces on the washer and retainer and a body portion extending across the said radially disposed surface on the washer, a filler ring disposed between the body portion and the washer and filling the space therebetween in an axial direction and also giving radial support to the lip, and resilient means compressed between the abutment and the packing element to urge the lip into wedging sealing engagement between the washer and retainer and urging the washer through said packing element against the other relatively rotatable element.

2. The combination described in claim 1, wherein the tapered lip is formed on the end of a hollow frusto-conical portion of the body member which portion is capable of being distorted under the action of said resilient means, said distortion being prevented by the filler ring.

3. The combination described in claim 1, wherein the packing element extends across the radially disposed surface on the washer to the inner cylindrical surface on the retainer and forms a fluid-tight seal therebetween, whereby to protect the filler ring from contact with fluids in which the washer is immersed.

4. The combination described in claim 1, wherein the washer has a cylindrical extension adjacent the radially disposed wall, and the packing element has a cylindrical portion in contact with the cylindrical extension and extending into the filler ring in concentric relation therewith.

5. The combination described in claim 1, said filler ring being made of an elastomeric material subject to deterioration by the fluid sealed and said packing element is made of a material impervious to the fluid sealed, said washer having a cylindrical extension adjacent the radially disposed wall and said packing element extending across the radially disposed wall in spaced relation thereto from the cylindrical extension to the inner cylindrical surface on the retainer and forming a fluid-tight seal therebetween, whereby to protect the filler ring from contact with fluids disposed on the exterior of the washer.

References Cited in the file of this patent

UNITED STATES PATENTS

| 2,497,704 | Voytech | Feb. 14, 1950 |
| 2,554,406 | Hastings et al. | May 22, 1951 |
| 2,653,837 | Voytech | Sept. 29, 1953 |
| 2,670,973 | Ginther et al. | Mar. 2, 1954 |
| 2,705,177 | Waring | Mar. 29, 1955 |

FOREIGN PATENTS

| 649,863 | Great Britain | Feb. 7, 1951 |